US005953977A

United States Patent [19]

Krishna et al.

[11] Patent Number: 5,953,977

[45] Date of Patent: Sep. 21, 1999

[54] SIMULATION MODELING OF NON-LINEAR HYDRAULIC ACTUATOR RESPONSE

[75] Inventors: Murali Krishna, Pittsburgh, Pa.; Stephen V. Lunzman, Chillicothe, Ill.

[73] Assignee: Carnegie Mellon University, Pittsburgh, Pa.

[21] Appl. No.: 09/172,306

[22] Filed: Oct. 14, 1998

Related U.S. Application Data

[60] Provisional application No. 60/068,246, Dec. 19, 1997.

[51] Int. Cl.[6] .................. F15B 13/16; F16D 31/02

[52] U.S. Cl. .................. 91/361; 60/421; 60/426; 60/427

[58] Field of Search .................. 91/361; 60/420, 60/421, 426, 427

[56] References Cited

U.S. PATENT DOCUMENTS

| | | | |
|---|---|---|---|
| 5,182,908 | 2/1993 | Devier et al. | 60/420 |
| 5,230,272 | 7/1993 | Schmitz | 91/361 |
| 5,249,421 | 10/1993 | Lunzman | 60/422 |
| 5,305,681 | 4/1994 | Devier et al. | 91/361 |
| 5,357,424 | 10/1994 | Kakizaki et al. | 364/149 |
| 5,383,390 | 1/1995 | Lukich | 91/361 |
| 5,457,960 | 10/1995 | Morishita | 91/361 |
| 5,481,959 | 1/1996 | Watanabe et al. | 91/361 |
| 5,490,384 | 2/1996 | Lunzman | 60/327 |
| 5,560,387 | 10/1996 | Devier et al. | 137/1 |
| 5,613,419 | 3/1997 | Pierson et al. | 91/361 |
| 5,701,793 | 12/1997 | Gardner et al. | 91/361 |

OTHER PUBLICATIONS

Shiller et al.; On Computing the Global Time–Optimal Motions of Robotic Manipulators in the Presence of Obstacles; 1991; pp. 785–797.

Krishna et al, Hydraulic System Modeling Through Memory–Based Learning; IEEE International Conference on Intelligent Robot Systems, pp. 1733–1738, Oct. 1998.

Craig, Introduction To Robotics Mechanics & Control, Addison–Wesley Publishing Co., Second Edition; 1989, pp. 205–220.

Li et al, Modelling & Simulation Of An Electro–Hydraulic Mining Manipulator; IEEE International Conference on Robotics & Automation, Apr. 1997, pp. 1663–1668.

*Primary Examiner*—Hoang Nguyen
*Attorney, Agent, or Firm*—Haverstock, Garrett & Roberts

[57] ABSTRACT

In order to accomplish many tasks of a machine efficiently, a motion planning system predetermines the response of the machine to a given set of motion commands. With two or more actuators being driven by a single hydraulic pump, there may not be adequate hydraulic pressure to drive both of the actuators at the speed requested. In order to determine the non-linear response of the actuators and the optimal combination of motions of the moving parts driven by the actuators, a controller for the machine is modeled as a linear dynamic system. The non-linear response of the actuators is modeled using a look-up table that is a function of internal variables of the machine's actuators and hydraulic system. The number of input, or independent, variables that are supplied to the table look-up functions is proportional to the number of actuators being driven by a single pump. Sensors provide data regarding the internal state of each actuator including variables such as spool valve position and cylinder force. These variables are used to index into tables containing data that represents each actuator's constraint surface. The constraint surfaces are predetermined and are dependent on the state of the other actuators driven by the same pump.

17 Claims, 6 Drawing Sheets

SIMULATION MODELING OF NON-LINEAR HYDRAULIC ACTUATOR RESPONSE

This application is based on U.S. Provisional patent application No. 60/068,246, which was filed on Dec. 19, 1997.

TECHNICAL FIELD

This invention relates generally to simulation models for performance of hydraulic systems under loading conditions and, more particularly, to an apparatus for modeling the non-linear interactions of hydraulic actuators in a hydraulic system.

BACKGROUND ART

Hydraulic machines are commonly used in the areas of construction, mining, and excavation. In a typical mining and excavating operation, large hydraulic machinery fills a bucket with material, transports the bucket load to a truck or conveyer belt, and unloads the material into the truck bed or onto the belt. Such repetitive tasks are ideal candidates for increased productivity through automation.

Robotic systems are typically designed to perform tasks as efficiently as possible by optimizing performance criteria such as fuel consumption and time to complete a task. Robot motion planning systems may use dynamic models of the robot to determine non-linear effects and to plan optimal motion paths. Such a motion planning system may adjust the commands or paths of motion according to the simulated response of the robot. Simple linear models constructed to approximate the robot's response often fail to yield satisfactory results due to non-linear actuator interactions that are not represented in the simplified model. Non-linear models are more accurate, but it may be difficult to solve them in real-time with data processors that are feasible to use for these purposes. For example, a full analytical model of an automated excavator including linkage and actuator dynamics, is a coupled, eighth-order non-linear system of equations that requires several hours to solve on a microprocessor. The non-linearity is due not only to the dynamic coupling between the links of such a machine, but also to the coupling between the different actuators. The inter-actuator coupling is partly due to a single engine providing power to the machine, with the power demanded being frequently higher than the maximum output of the engine. It may also be partly due to the design of the hydraulic system itself, especially when one pump drives more than one actuator and can not supply full pressure to all of the actuators during high demand.

A variety of methods to model and simulate performance of electrically-driven actuators have been developed. A common approach is to model actuators with a transfer function from which output response may be computed for given input signals. This method is not suitable, however, to model systems that are subject to non-linear performance limitations and interactions that arise when two or more actuators are driven by the same hydraulic pump.

U.S. Pat. No. 5,182,908, issued to Devier et al. discloses the use of table-look-up functions to model a system for controlling a machine wherein several hydraulically actuated parts share the same fluid pump. The table look-up functions use multiple inputs to determine which of the actuators should be given priority while limiting flow to the others. The Devier et al. patent does not, however, teach a method for determining information that is required by motion planning algorithms such as the actual flow distribution to each of the actuators.

U.S. Pat. Nos. 4,712,376 and 5,167,121 disclose control systems where one hydraulic pump is used to drive two or more hydraulic actuators. The devices in these patents assume that the commanded fluid flow is provided to one of the actuators, while the remaining flow is used to drive the other actuator. These devices do not accommodate situations where two actuators require similar force at the same time, however.

Accordingly, the present invention is directed to overcoming one or more of the problems as set forth above.

DISCLOSURE OF THE INVENTION

In one embodiment of the present invention, a machine having moving parts that are hydraulically actuated is adapted to operate autonomously. A motion planning system determines the movements required by the machine to accomplish required tasks. In order to accomplish the tasks efficiently, the motion planning system predetermines the response of the machine to a given set of motion commands. With two or more actuators being driven by a single hydraulic pump, there may not be adequate hydraulic pressure to drive both of the actuators at the speed requested. In order to determine the non-linear response of the actuators and the optimal combination of motions of the moving parts driven by the actuators, a controller for the machine is modeled as a linear dynamic system. The non-linear response of the actuators is modeled using a look-up table that is a function of internal variables of the machine's actuators and hydraulic system. The number of input, or independent, variables that are supplied to the table look-up functions is proportional to the number of actuators being driven by a single pump. Sensors provide data regarding the internal state of each actuator including variables such as spool valve position and cylinder force. These variables are used to index into tables containing data that represents each actuator's constraint surface. The constraint surfaces are predetermined and are dependent on the state of the other actuators driven by the same pump.

BEST MODE FOR CARRYING OUT THE INVENTION

Figure 1:
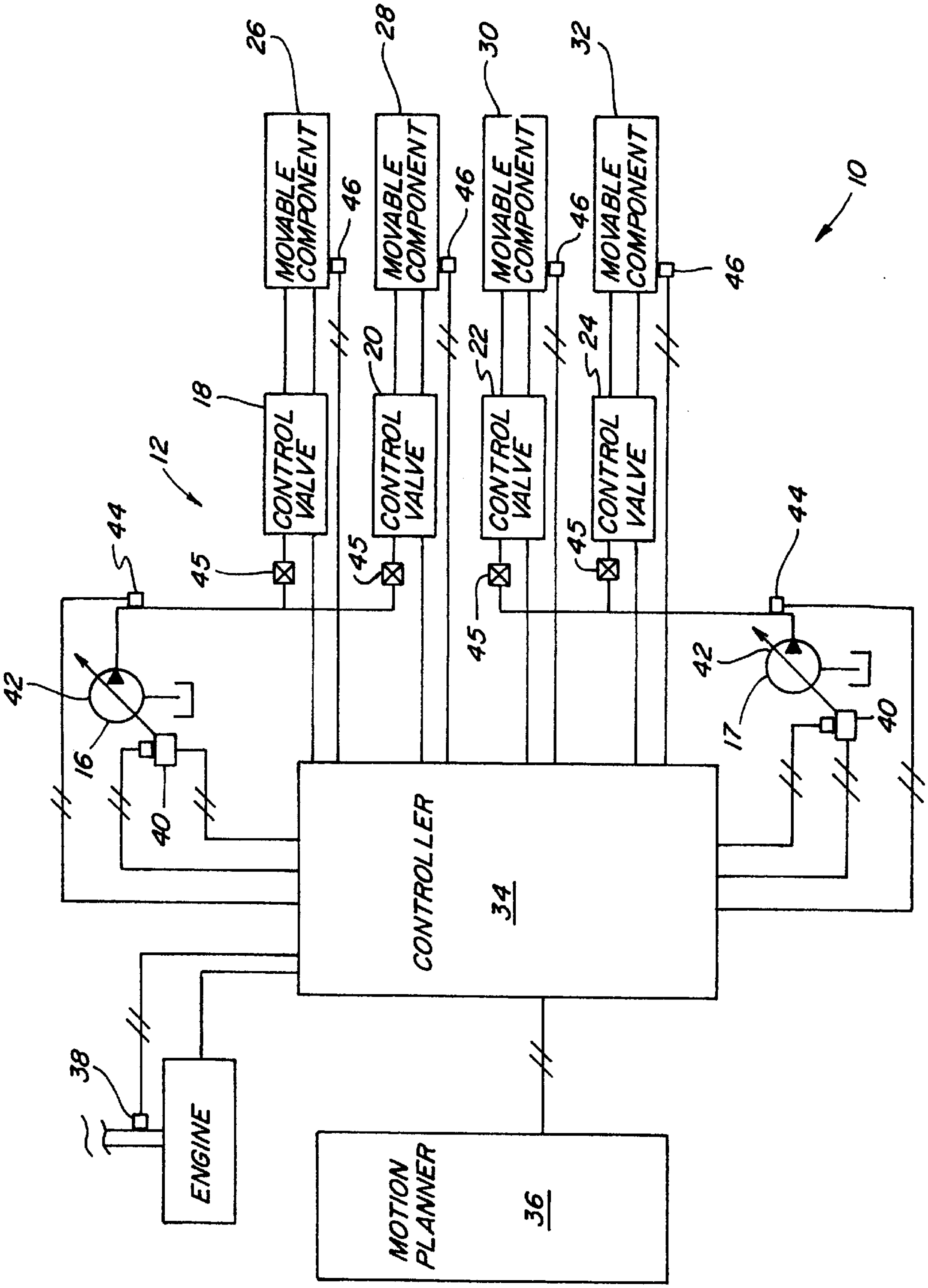
FIG. 1 is a diagrammatic view of an embodiment of a hydraulic system of a machine.
Figure 3:
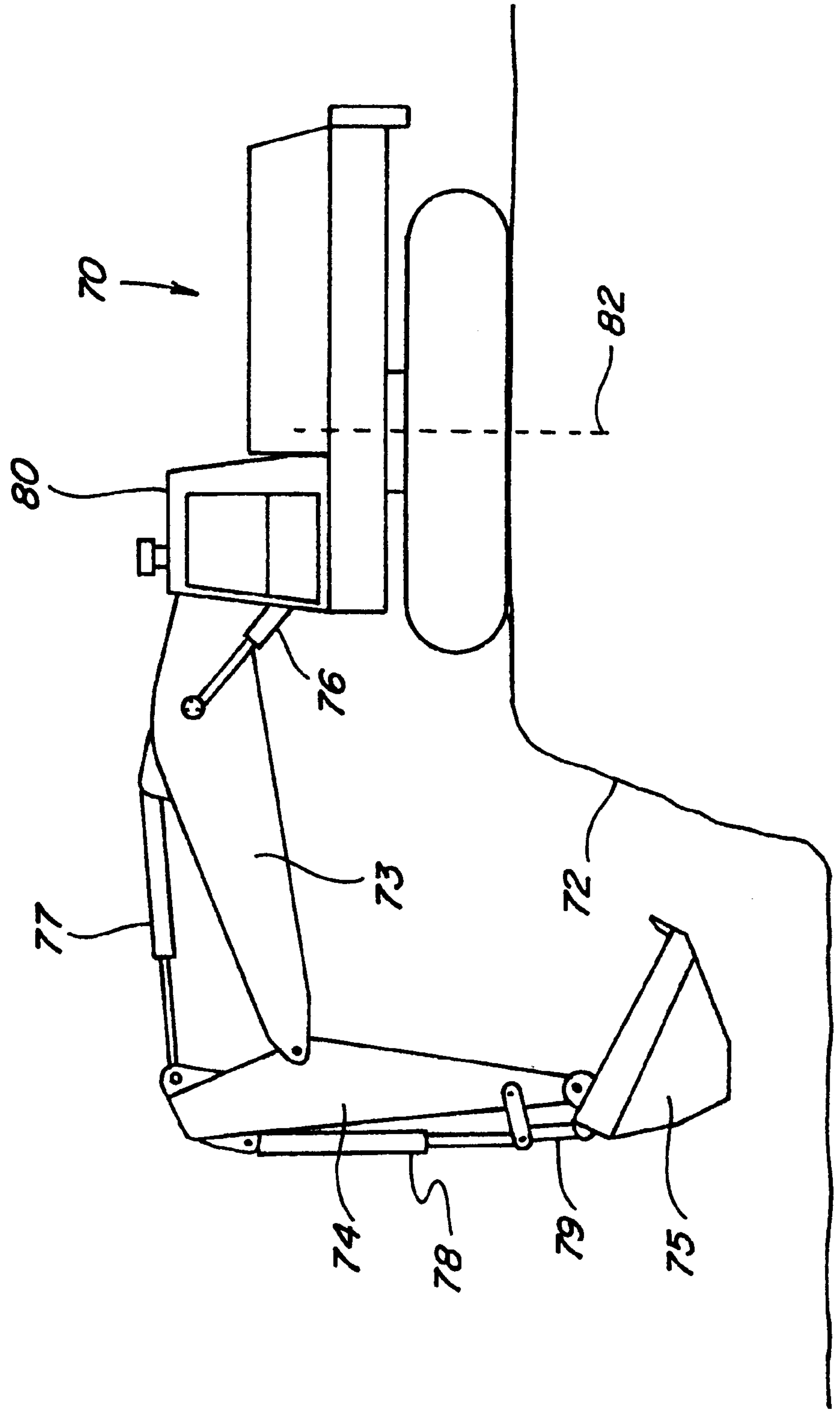
FIG. 3 is a side view of a hydraulic excavator.

Referring to the drawings, FIG. 1 shows an example of an electrohydraulic apparatus 10 with which the present invention may be utilized. A hydraulic system 12 of a machine such as a hydraulic excavator or loader, includes a power source 14, commonly an engine. The engine 14 drives one or more variable displacement pumps 16, 17 which deliver hydraulic fluid to a plurality of control valves 18, 20, 22, 24, each control valve being operatively connected to a movable component 26, 28, 30, 32 of the machine. For example, in a hydraulic excavator the movable components would be a boom 73, a stick 74 and a bucket 75 as shown in FIG. 3. The hydraulic lines to the control valves 18, 20, 22, 24 are shown in FIG. 1 as being connected in parallel, but they may also be connected in series. Each control valve 18, 20, 22, 24 includes a spool or stem for movement therein. The control valves 18, 20, 22, 24 may include closed center pressure compensated valves or open center non-pressure compensated valves.

The control valves 18, 20, 22, 24 are electrically actuatable in a manner that fluid flow is controlled by electrical signals. Pilot valves may be connected between a pilot pump and the respective control valves 18, 20, 22, 24. The present invention is not, however, limited to the use of pilot valves. For example, direct actuating elements may be used instead of the pilot valves.

A controller 34 delivers electrical signals to proportionally displace the valve stems, thereby regulating flow from the variable displacement pumps 16, 17 to the respective movable components 26, 28, 30, 32. The controller 34 may be a microprocessor-based controller, as is well known in the art, which executes programmed logic for computing and decision making processes. The program may be stored in system memory which may include read-only memory, random access memory, or the like.

A motion planner 36 provides inputs to the controller 34 in the form of command signals which correspond to desired positions for the movable components 26, 28, 30, 32. The demand signals also indicate the demand for fluid flow to the movable components 26, 28, 30, 32. Additional information is provided to the controller 34 by an engine speed sensing means 38, for example, a device sensitive to the movement of gear teeth on an engine, as is well known in the art. The device delivers a signal to the controller 34 that is proportional to the actual speed of the engine 14.

A swashplate angle sensing device 40 senses the angle of a swashplate 42 of each pump 16, 17. The swashplate angle sensing device 40 delivers an electronic signal representative of the actual swashplate angle to the controller 34. Further, a pressure device 44 senses the output pressure of each pump 16, 17 and a representative signal is delivered to the controller 34. In the present invention, the forces on the hydraulic cylinders associated with each moving component must also be measured using means for sensing hydraulic load pressure 45 of each control valve 18, 20, 22, 24. The measured signals are used to index into data tables containing data representing the machine's response. The pump and cylinder pressures may be sensed electronically or mechanically as is well known in the art.

If open center non-pressure compensated valves are utilized, it may be desirable to measure the velocity of each movable component to obtain operating characteristics similar to those of closed center pressure compensated valves. For example, velocity sensors 46 produce a signal representative of the movement of each movable part. The controller 34 receives the velocity signals and controls the displacement of the valve stems and pump accordingly.

In order for the motion planner 36 to determine optimal paths for the movable components 26, 28, 30, 32 of the machine, the motion planner 36 must have knowledge of the dynamic response and constraints of the machine. For example, for most hydraulic machines having one hydraulic pump supplying hydraulic fluid to drive two or more movable components, moving the components at the same time is usually not the most optimal means of operating the machine. This is due to the flow limiting that occurs when the movable components require more fluid pressure than the pump can supply.

Figure 2:
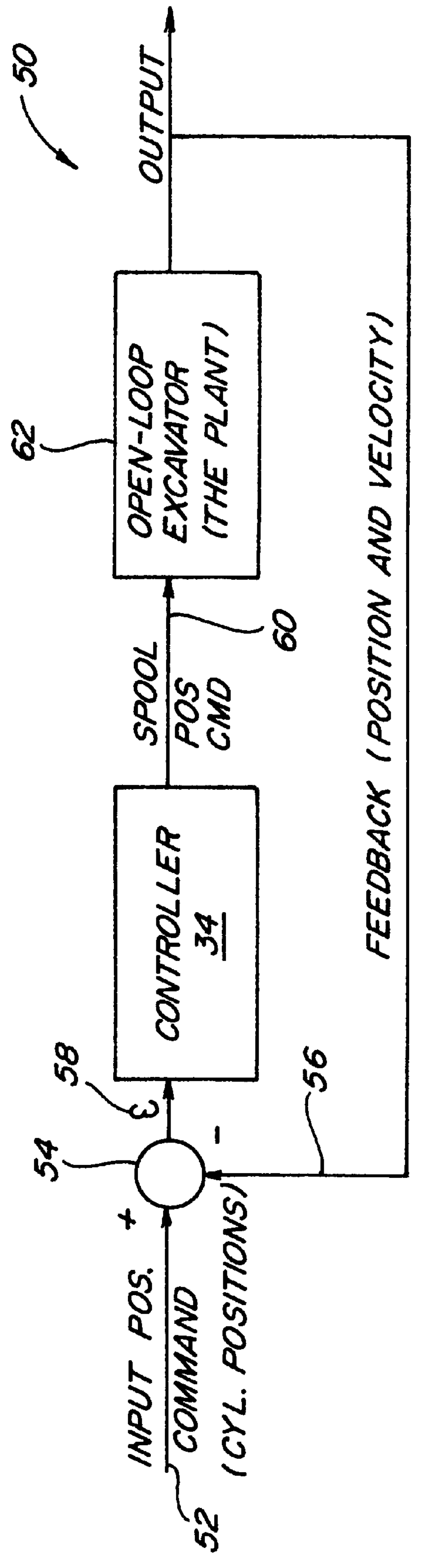
FIG. 2 is a block diagram of a feedback and control system associated with the machine.

The present invention uses a linear dynamic model for the controller 34 while the machine is modeled using table look-up routines to provide data pertaining to the steady-state response of the movable components 26, 28, 30, 32. FIG. 2 is a block diagram of the controller 34 incorporated in a feedback and control system 50 to control a portion of a hydraulically driven machine. An input position command 52 for a movable component (not shown) controlled by the control system 50 is input to a summing junction 54 where a feedback position signal 56 of the movable component is subtracted from the input position command 52. A resulting error signal 58 is input to the controller 34 which computes a spool position command signal 60 to the open-loop excavator 62. The machine's response to the spool position command signal 60 is determined using the valve or actuator positions and the loads on the hydraulic cylinders as indexes into look-up tables. The look-up tables contain data pertaining to the maximum rate that a movable component may be driven based on the position commands and the pressure loads on the cylinders of the movable components that are driven by the same pump.

The tables contain steady-state data that may be derived from empirical studies by commanding various combinations of commanded positions to the movable components of an actual machine and measuring the resulting position of the movable components. The data tables are stored in memory associated with the controller 34 (in FIG. 1) and retrieved by using the valve or actuator positions, and the loads on the hydraulic cylinders as indexes into the data tables or arrays. Various interpolation methods may be used to compute values between data points.

Any number of actuators may be driven by a single pump, depending on the capabilities of the hydraulic pumps. The valve position command, the cylinder force corresponding to each valve or actuator associated with a pump, and other measured variables such as the velocity of the moving component, can be used to index into the data tables. As a result, a valve spool position command, a cylinder force measurement, and any other measured variables on which the data tables depend, will be required for each actuator or valve that is driven by a common pump.

Industrial Applicability

The above described invention is useful for automating hydraulic machines possessing a plurality of movable components, such as a hydraulic excavator 70 shown in FIG. 3 for gathering soil from a dig face 72. The excavator 70 includes a boom 73, a stick 74, a bucket 75, and a body 80. The boom 73 is pivotally mounted on the excavator 70. The stick 74 is pivotally connected to the free end of the boom 73. The bucket 75 is pivotally attached to the stick 74.

The boom 73, stick, 74, and bucket 75 are independently and controllably actuated by linearly extendible hydraulic cylinders. The boom 73 is actuated by at least one boom hydraulic cylinder 76 for upward and downward movements of the stick 74. The boom hydraulic cylinder 76 is connected between the excavator 70 and the boom 73. The stick 74 is actuated by at least one stick hydraulic cylinder 77 for longitudinal horizontal movements of the bucket 75. The stick hydraulic cylinder 77 is connected between the boom 73 and the stick 74. The bucket 75 is actuated by a bucket hydraulic cylinder 78 and has a radial range of motion about the stick 74. The bucket hydraulic cylinder 78 is connected to the stick 74 and to a linkage 79. The linkage 79 is connected to the stick 74 and the bucket 75. The boom 73 is raised by extending the boom cylinder 76 and lowered by retracting the same cylinder 76. Retracting the stick hydraulic cylinder 77 moves the bucket 75 away from the excavator

70 and extending the stick hydraulic cylinders 77 moves the bucket 75 toward the excavator 70. Finally, the bucket 75 is rotated away from the excavator 70 when the bucket hydraulic cylinder 78 is retracted, and rotated toward the excavator 70 when the bucket hydraulic cylinder 78 is extended.

In many situations, the excavator 70 must perform rapidly under high loading conditions such as digging into the soil face 72. In this situation, the boom, stick, and bucket cylinders 76, 77, 78, are used concurrently throughout the work cycle. The body 80 of the excavator 70 is also capable of being rotated, or swung, about a vertical axis 82 by hydraulically driven components. The motion planner 36, as shown in FIG. 1, simulates the response of the machine in real-time to determine the optimal path of movement for each movable component 26, 28, 30, 32 based on the capabilities of the machine and the task to be accomplished.

Figure 4:
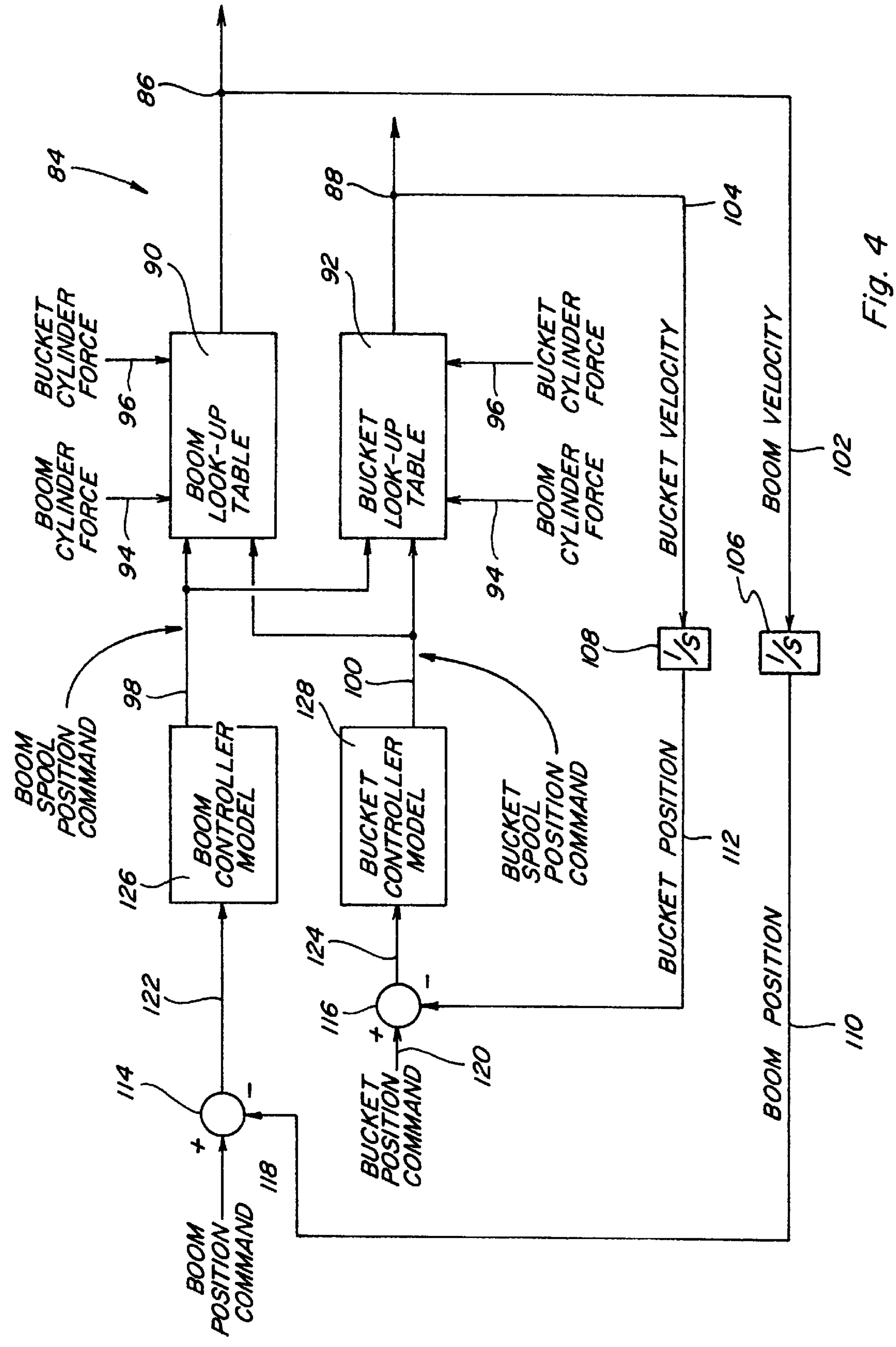
FIG. 4 is a diagrammatic view of a control system for a machine in which the present invention may be embodied.

FIG. 4 shows a block diagram incorporating a preferred embodiment of the present invention for the boom and bucket of a hydraulic excavator. The components of the block diagram may be simulated to provide the motion planner 36 with information regarding the response of the machine. The boom and bucket actuators are both driven by a common pump (not shown) that cannot supply the total power required to the pair of actuators under certain loading conditions. When the interaction between the actuators affects the power available to one or both of the cylinders, the machine response will be non-linear. In FIG. 4, the boom feedback loop 86 is dependent on the bucket feedback loop 88 and vice versa since the indices for the boom response table look-up 90 and the bucket response table look-up 92 include the boom cylinder force 94, the bucket cylinder force 96, the boom spool position command 98, and the bucket spool position command 100. The output of the table lookups 90, 92 is the boom velocity 102 and the bucket velocity 104, respectively. The position of the boom and bucket is calculated by sending each of the output velocity signals 102, 104 through an integrator 106, 108. The simulated response of the machine, namely, the boom and bucket positions 110, 112 are then fed back to the input of the respective summing junctions 114, 116 to calculate the difference between the commanded positions 118, 120 and the actual positions 110, 112 that comprise the error signals 122, 124 to the boom controller 126 and the bucket controller 128, respectively.

The boom velocity 102 and boom position 110, and the bucket velocity 104 and bucket position 112 are used by the motion planner 36 as the response of the machine to the boom position command 118 and the bucket position command 120. The responses are used to determine the optimal motion commands to input to the actual machine. The motion planner 36 may be capable of determining either a single optimal movement or a series of optimal movements. Thus, the simulation model of the machine may be run once or multiple times during a pass through the motion planner 36, depending on the results desired from the motion planning subsystem.

Figure 5:
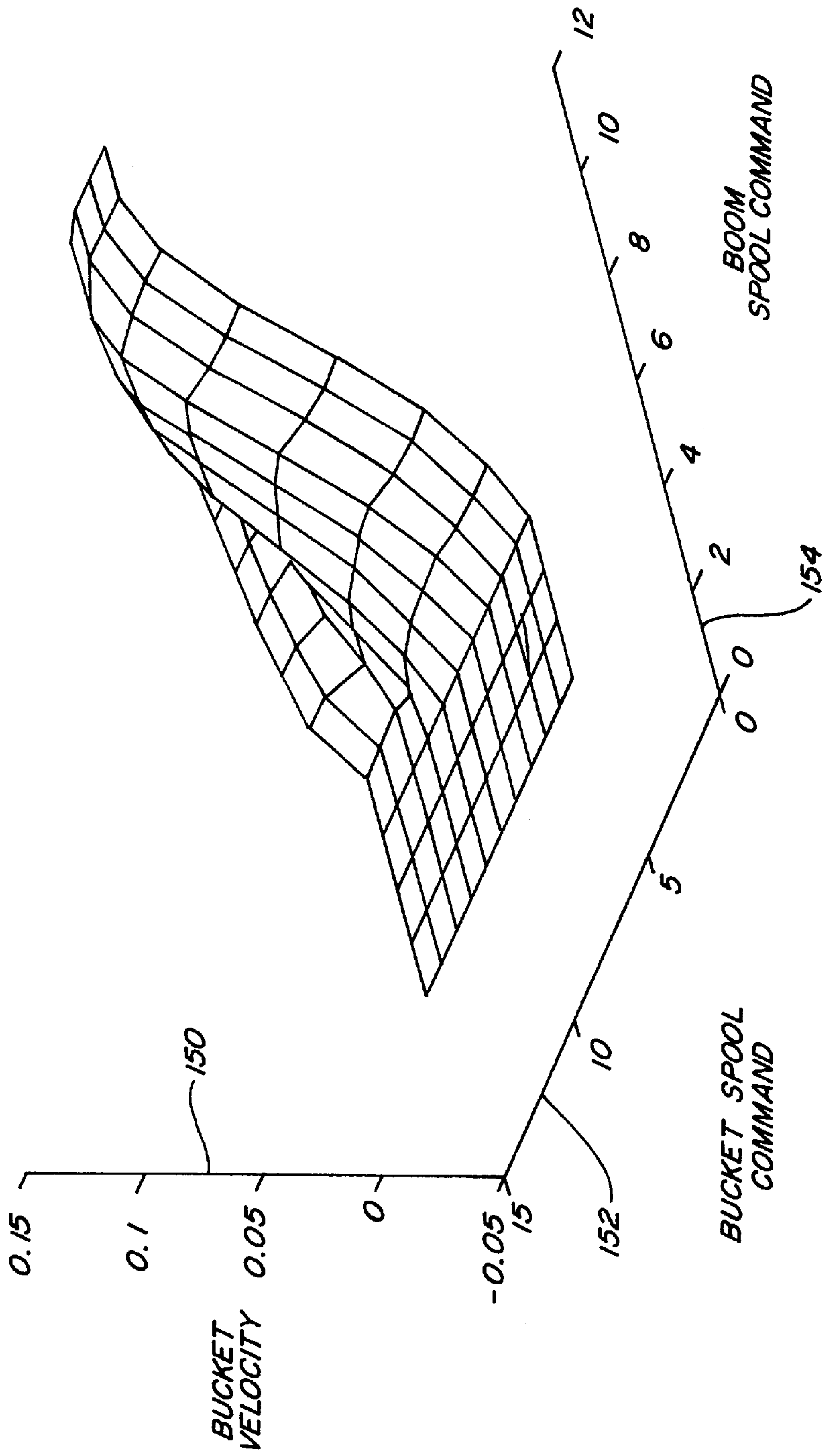
FIG. 5 is a graph of a surface constraint for the response of an actuator.
Figure 6:
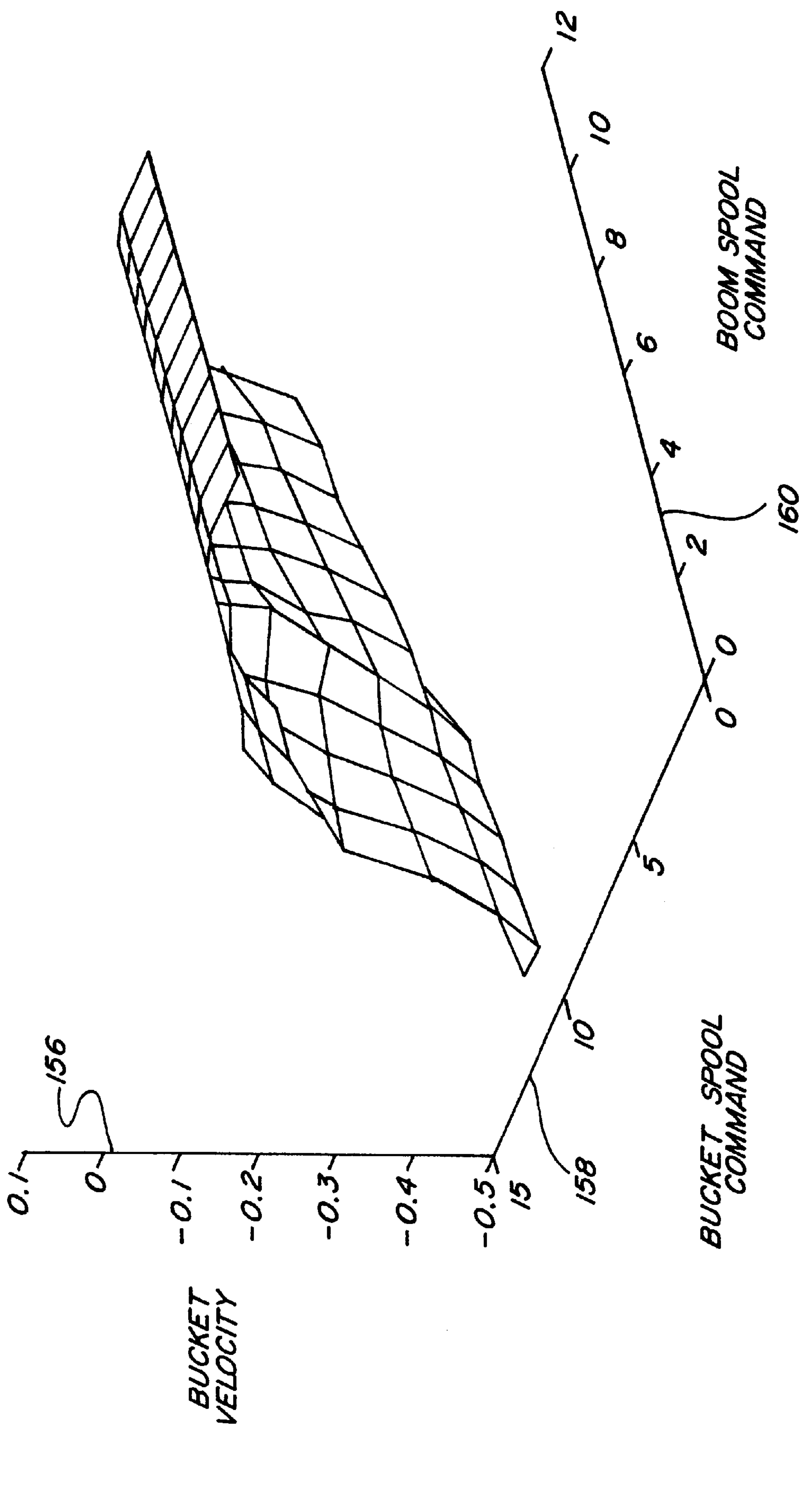
FIG. 6 is a graph of a surface constraint for the response of another actuator.

The graphs in FIGS. 5 and 6 show examples of surface constraint data that may be tabularized and programmed in memory for use by a table look-up routine. FIGS. 5 and 6 show the boom and bucket response surfaces, respectively, for one combination of boom and bucket cylinder forces. For each combination of boom and bucket cylinder forces, different response surfaces for the boom and the bucket velocities are used. FIG. 5 shows the rates of movement, or velocity response 150 that the boom may attain for various combinations of bucket spool commands 152 and boom spool commands 154. When the bucket spool command 152 is zero, the boom velocity 150 increases proportionally to the boom spool command 154 until the rate that the system can move the boom in response to the boom spool command 154 levels out. When the bucket spool command 152 is concurrently increasing with the boom spool command 154, the rate of movement of the boom decreases as the system allocates the power available from the common hydraulic pump to drive both actuators or valves. FIG. 6 shows the rate of movement, or velocity response 156 of the bucket to various combinations of bucket spool commands 158 and boom spool commands 160. When the boom spool command 160 is zero, the coordinate system for bucket velocity 156 is chosen so that magnitude of the bucket velocity 156 increases as the bucket spool command 158 increases. As the boom spool command 160 concurrently increases, the magnitude of the bucket velocity 156 decreases as the power available from the common hydraulic pump is apportioned between the bucket and the boom actuators.

The graphs in FIGS. 5 and 6 are illustrative of the type of data that is used with the present invention. Data for various types of movable components driven by a common hydraulic pump may be implemented with the present invention to determine the machine's response to a combination of spool position commands, cylinder forces, and other measured variables such as the swing velocity of the hydraulic excavator. The example discussed hereinabove for FIGS. 5 and 6 applies to a combination of the boom and bucket of an excavator being driven with a common pump. The present invention may also be applied to other situations where two or more movable components share a common pump, such as a combination of the stick and swing actuators associated with a hydraulic excavator as shown in FIG. 3. The stick spool position command, swing spool position command, swing velocity and inertia, and stick cylinder force are used as indices to the response data tables. If more than two surfaces are driven by a common pump, variables such as the spool position commands, the cylinder forces, and/or the inertia are required to index into the data tables to determine the response of the movable surfaces. Inertias may be calculated from the position of a movable component. The surface rate of response may be represented by velocity or acceleration. For example, acceleration about the swing axis may be output from the table instead of velocity. The present invention is also applicable to model the response of other types of hydraulically driven earthmoving machines including wheel loaders, track-type tractors, compactors, motor graders, agricultural machinery, pavers, asphalt layers, and the like, which exhibit both (1) mobility over or through a work site, and (2) the capacity to alter the topography or geography of a work site with a tool or operative portion of the machine such as a bucket, shovel, blade, ripper, compacting wheel and the like where the loading on movable components driven by a common pump may cause the machine to respond in a non-linear fashion. The present invention may also be used to model the linear as well as the non-linear response of one or more movable components, as an alternative to using other linear and non-linear modeling techniques.

Other aspects, objects and advantages of the present invention can be obtained from a study of the drawings, the disclosure and the appended claims.

We claim:

1. A method for modeling the response of a movable component to a commanded position, the movable component being operably connected to a hydraulic actuator that is driven by a hydraulic pump supplying pressurized fluid to the actuator through a control valve, the control valve having a spool for controlling the flow of fluid to the actuator, the method comprising the steps of:

(a) calculating a spool position command based on the difference between the desired position of the movable component and the actual position of the movable component;

(b) measuring the force on the actuator due to the force of the hydraulic fluid; and (c) using the spool position command and the force on the actuator as indices into a table containing data on the rate of response of the hydraulic actuator for a range of spool position commands and actuator forces.

2. The method as set forth in claim 1 wherein step (a) further comprises using a model of a controller to calculate the spool position command based on the difference between the desired position of the movable component and the actual position of the movable component.

3. The method as set forth in claim 1 wherein step (b) comprises measuring the inertia of the movable component and step (c) comprises using the inertia as an index into the data table, the data table containing data on the rate of response of the hydraulic actuator for a range of spool position commands and inertias.

4. The method as set forth in claim 1 or 3 wherein step (c) further comprises using a data table containing linear and non-linear data on the rate of response of the hydraulic actuator.

5. A method for modeling the response of a plurality of movable components to a commanded position, the movable components being operably connected to corresponding hydraulic actuators, the hydraulic actuators being driven by a common hydraulic pump supplying pressurized fluid to the actuators through a control valve in each actuator, each control valve having a spool for controlling the flow of fluid to the actuator, the method comprising the steps of:

(a) calculating a spool position command for each actuator based on the difference between the desired position of the movable component and the actual position of the movable component;

(b) measuring the force on each actuator due to the force of the hydraulic fluid; and (c) using the spool position commands and the forces on the actuators as indices into tables containing data on the rate of response of each hydraulic actuator for a range of values of at least one measured variable.

6. The method as set forth in claim 5 wherein step (a) further comprises using a model of a controller to calculate the spool position commands based on the difference between the desired positions of the movable components and the actual positions of the movable components.

7. The method as set forth in claim 5 wherein step (b) comprises measuring the inertia of at least one movable component and step (c) comprises using the inertia as an index into the data tables, the data tables including data on the rate of response of the hydraulic actuators for a range of spool position commands, forces on the actuators, and swing velocity.

8. The method as set forth in claim 5 or 7 wherein step (c) further comprises using data tables containing linear and non-linear data on the rates of movement of the hydraulic actuators.

9. An apparatus for determining the response of at least one movable component to a commanded position, the at least one movable component being operably connected to a hydraulic actuator, the apparatus comprising:

a hydraulic pump supplying pressurized fluid to the actuator through a control valve, the control valve having a spool for controlling the flow of fluid to the actuator;

a controller operable to calculate a spool position command based on the difference between the desired position of the movable component and the actual position of the movable component;

means operable to measure the force on the actuator due to the force of the hydraulic fluid; and a data processor operable to execute a table look-up algorithm using the spool position command and the force on the actuator as indices into a table containing data on the rate of response of the hydraulic actuator for a range of spool position commands and actuator forces.

10. The apparatus as set forth in claim 9 further comprising means operable to measure the inertia of a movable component and using it as an index into the data table, the data table containing data on the rate of response of the hydraulic actuator for a range of at least one measured variable.

11. The method as set forth in claim 9 or 10 wherein the data table includes linear and non-linear data on the rate of response of the hydraulic actuator.

12. An apparatus for determining the response of a plurality of movable components, each movable component being operably connected to a corresponding hydraulic actuator, the apparatus comprising:

a hydraulic pump supplying pressurized fluid to the actuators, each actuator having a control valve with a spool for controlling the flow of the pressurized fluid to the actuator;

at least one controller operable to calculate a spool position command for each actuator based on the difference between the desired position of the movable component and the actual position of the movable component connected to the actuator;

means operable to measure the force on each actuator due to the force of the pressurized fluid; and a data processor operable to execute a table look-up algorithm that uses the spool position commands and the forces on the actuators as indices into at least one table containing data on the rate of response of the hydraulic actuators for a range of spool position commands and actuator forces.

13. The apparatus as set forth in claim 12 further comprising means operable to measure the inertia of at least one movable component and using the inertia as an index into at least one data table, the at least one data table containing data pertaining to the response of the hydraulic actuators for a range of spool position commands, forces on the actuators, and inertias.

14. The method as set forth in claim 12 or 13 wherein at least one data table includes non-linear data on the rate of response of the hydraulic actuators.

15. An apparatus for planning the movement of a hydraulic machine, the hydraulic machine having a plurality of moving components operably connected to actuators driven by pressurized hydraulic fluid, the apparatus comprising:

a data processor operable to execute a software model of at least one controller of the hydraulic machine, the controller supplying commands proportional to the desired positions of the movable components to at least one table look-up subroutine, the table look-up subroutine using the commands and the forces of the pressurized hydraulic fluid on the actuators as indices into at least one data table, at least one data table containing data corresponding to the response of the hydraulic actuators to the commands and the forces.

16. The apparatus as set forth in claim 15 wherein a plurality of the hydraulic actuators are driven by a common hydraulic pump and at least one data table includes data corresponding to the linear and non-linear response of the actuators.

17. The apparatus as set forth in claim 15 further comprising means operable to measure the inertia of at least one movable component and using the inertia as an index into at least one data table, the at least one data table containing data on the response of the hydraulic actuators for a range of spool position commands and inertias.

* * * * *